United States Patent Office 3,373,506
Patented Mar. 19, 1968

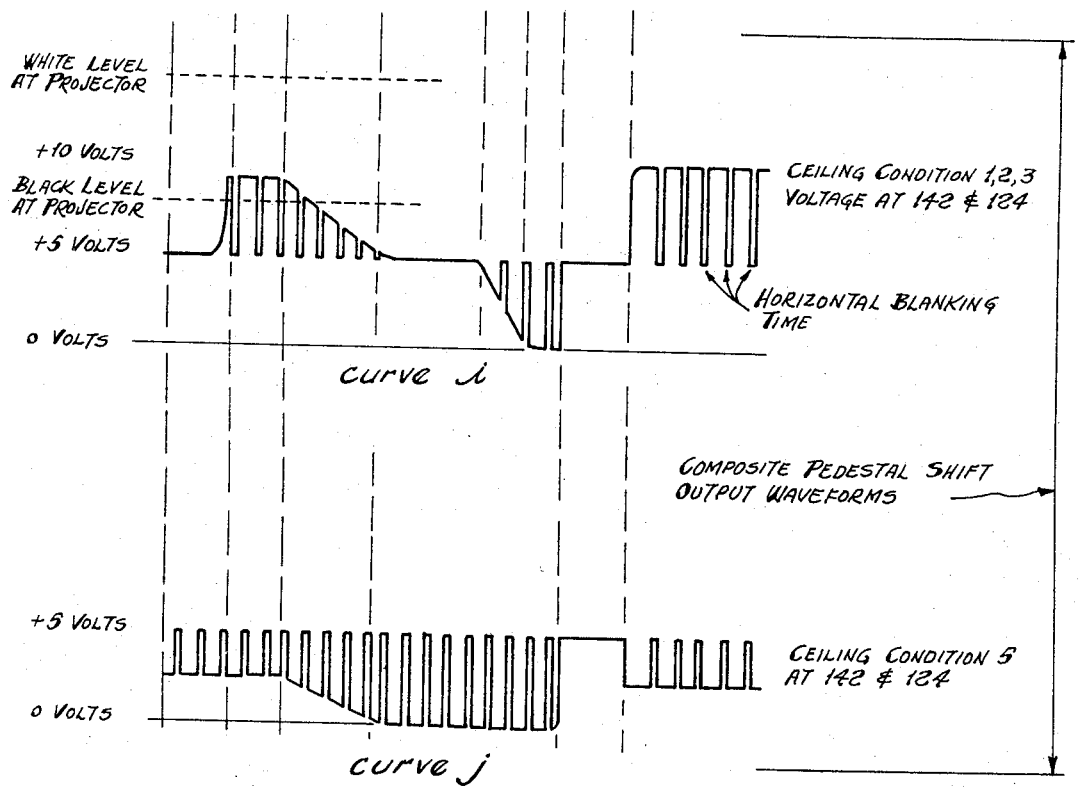

3,373,506
AIRCRAFT LANDING LIGHTS SIMULATOR
Dorsey Davidoff, Fort Lee, N.J., assignor to Dalto Electronics Corp., Norwood, N.J., a corporation of Delaware
Filed Aug. 16, 1966, Ser. No. 572,866
8 Claims. (Cl. 35—12)

ABSTRACT OF THE DISCLOSURE

In accordance with this invention means producing a variable blanking pedestal are provided to control the brightness of each line of a television presentation as a function of landing lights, visibility and ceiling and this variable is summed to a system video to form a composite video signal. Coupled with this capability is a signal generator means producing a video signal of a scene in which the level of brightness of background material is not more than 30% of the level of brightness of the airport lights such that landing lights can be simulated by variation of the pedestal blanking level of the video.

Background of invention

This invention relates to simulators for aircraft landing conditions and more particularly to apparatus and method in which the effect of aircraft landing lights, visibility and ceiling effects are simulated for low visibility landing conditions.

Conventional flight training simulators may utilize a television type visual display to simulate the airfield runway lights for night or low visibility landing conditions.

In such conventional flight training simulators a normal blanking pedestal is employed. A normal blanking pedestal is a blacker than black signal normally inserted in televisional signals to blank out the retrace of the horizontal scan of a television cathode ray tube. Such blanking pedestals are the most negative part of the video wave form since no horizontal synchronizing pulses are added as in broadcast television. These blanking pedestals are therefore used in conjunction with a synchronous clamp in the display amplifier to determine the brightness level of each line of the picture. The video normally has a constant amplitude blanking pedestal.

It is an object of this invention to provide an improved simulator which simulates not only the runway lights but also the visual effect of ceiling, visibility and the aircraft landing lights on a composite picture.

More particularly one object of this invention is to provide apparatus and method by which there is superimposed upon a television type display the effect of aircraft landing lights on the simulated image.

A further object is to provide means by which a progressive and changing image is developed as the aircraft landing lights proceed along the simulated runway.

Summary of invention

In general, the above is accomplished in accordance with the subject invention by providing a method and apparatus of producing a variable blanking pedestal to control the brightness of each line of the television presentation as a function of landing lights, visibility and ceiling. This variable blanking pedestal is developed by special circuitry hereinafter described and is then summed to the system video to form a composite video signal containing the variable pedestal signal. In addition a signal generator means is provided to produce a video signal representative of a landing area scene in which the lights of the airport provide close to 100% level of brightness and the background material not more than 30% level of brightness.

A TV camera used in conjunction with a model of an airport scene variably lighted to produce the relative levels of brightness mentioned above and to provide video amplitude signals representative of the same can be employed. However, a TV flying spot scanner can also be used as such a signal generator means and is presently preferred. This description of a preferred embodiment of the invention describes a scanning unit for a slide transparency of an airport scene. This slide is made in such a way that the lights of the airport provide close to 100% transmittance of the light from a flying spot scanner to photomultipliers of a light pick-up assembly. The background material, which is normally not visible in a night scene and is only visible under illumination of the landing lights, has a light transmittance which is never greater than 30%. When the landing lights are off the television projector brightness is adjusted so that this lower 30% of video is below cutoff and therefore does not appear in the presentation. When the landing lights are turned on, the pedestal blanking level of the video is raised, thus bringing the background information into view. In addition, the lines of the raster on the video screen becomes visible and this gives a general haze effect. The operation of this pedestal circuitry simulates landing lights. Dual thresholds are used for fading effects, simulating the probable illumination range of the landing lights. Means are provided for adjusting simulated landing light brightness, rate of fade, range and other factors.

Other objects and advantages will appear from the following description of an example of the invention, and the novel features will be particularly pointed out in the appended claims.

In the drawings:

FIGS. 5 to 7 show curves of several signal wave forms used to describe the invention.

Figure 1:
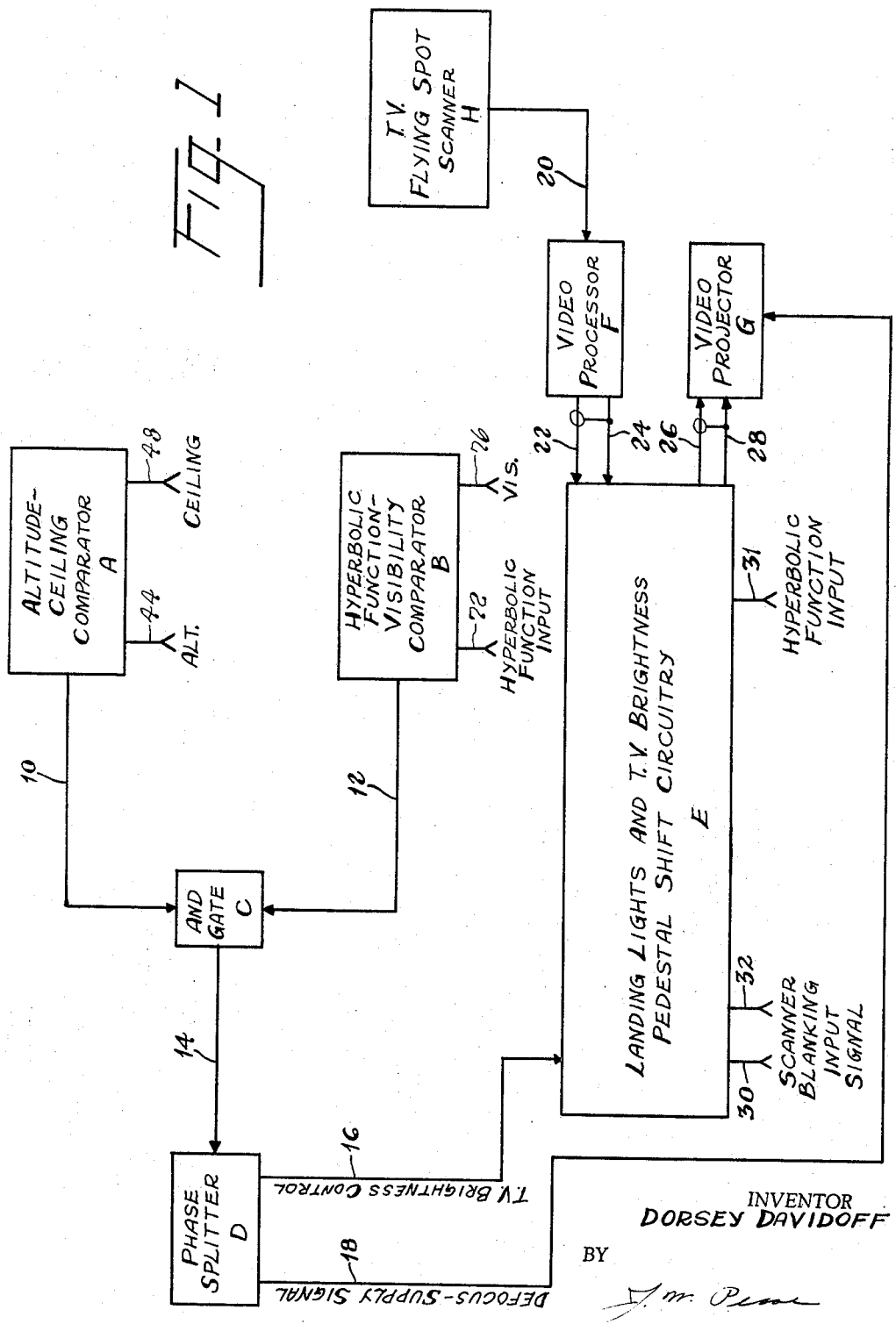
FIG. 1 is a block diagram of a simulator embodying the invention.

Referring to FIG. 1, the block diagram shown and representative of a simulator embodying the invention includes a comparator A for receiving input signals representative of ceiling condition and vehicle altitude to provide an output signal representative of the comparison of altitude and ceiling; a comparator B for receiving a hyperbolic function signal input and a visibility signal input to produce an output signal representative of a comparison of visibility and the hyperbolic function which represents the instantaneous range vs. the television vertical sweep. The output signals from the comparators A and B are passed on lines 10 and 12 to an "AND" gate indicated at C and the resulting signal is passed on line 14 to a phase splitter circuit D to produce on line 16 a TV brightness control signal and on line 18 a projector defocus supply signal. Line 16 is connected to the pedestal shift circuitry E to control through circuit E the pedestal shift. Line 18 is connected to the video projector G to control projector focus.

As shown in FIG. 1, a TV flying spot scanner H is provided to supply through a line 20 a video signal to a video processor F the output of which is passed on lines 22 and 24 to the pedestal shift circuitry indicated by block E. The signal received by the pedestal shift circuitry E on lines 22 and 24 is modified as will be explained hereinafter and the modified signal passed on lines 26 and 28 to the video projector indicated by the block G.

Figure 4:
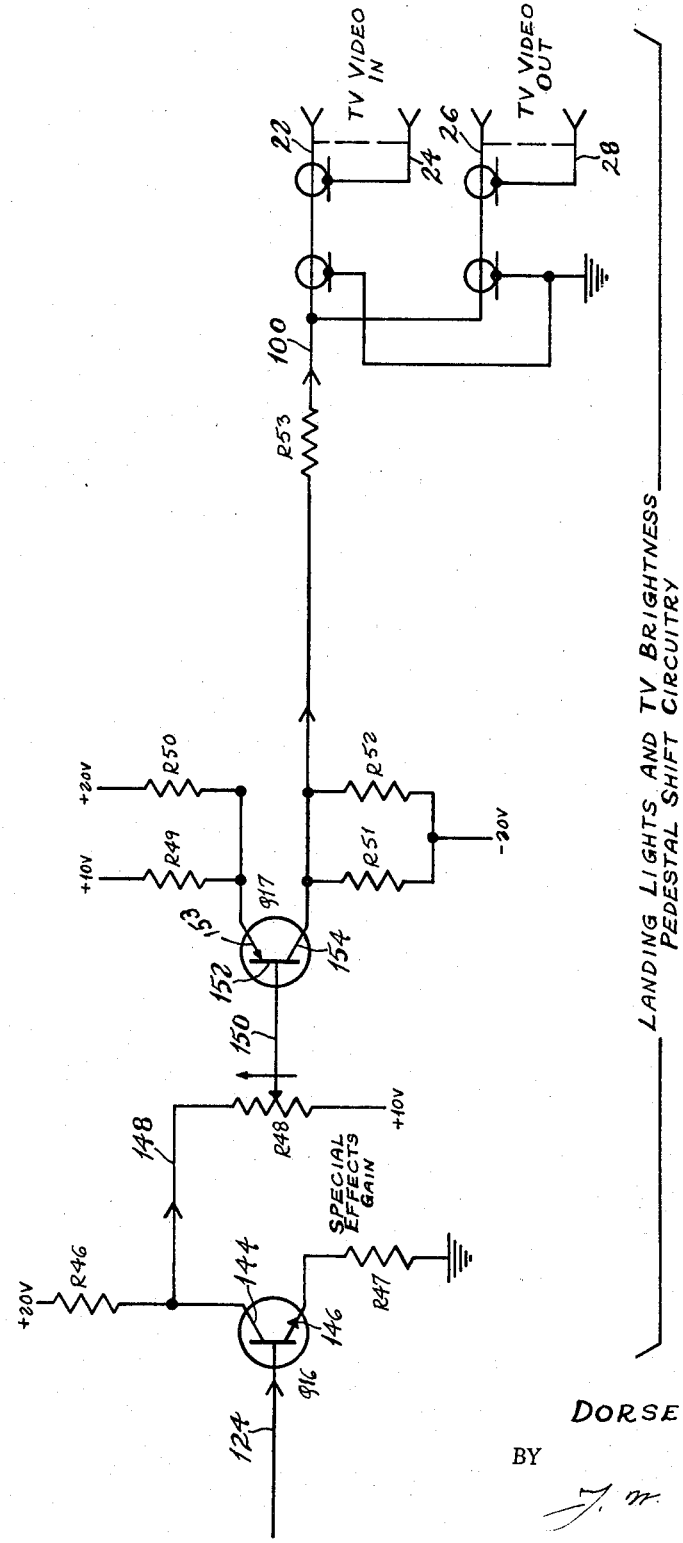
FIG. 4 is a schematic diagram of a television flying spot scanner shown in block form in FIG. 1.

Referring for the moment to FIG. 4, the TV flying spot scanner H includes a flying spot scanner CRT indicated at 30, a lens 32 and transparency 34 of a scene to be simulated and conventional photomultiplier means including a photo-tube 36 and preamplifier 40.

The basic principle of this simulator system is to simulate the effect on a scene of varying conditions of aircraft altitude, ceiling, visibility and the effect of the aircraft landing lights by way of the control of the video pedestal and the projector focus. As a factor in accomplishing the above the transparency slide 34 is made in such a manner that the lights of the airport provide close to 100% transmittance of light from the flying spot scanner to the photomultipliers of the light pickup assembly. The background material, which is normally not visible in a night scene and is only visible under illumination of the landing lights, has a light transmittance which is never greater than 30%.

The projector G (FIG. 1) which projects the visual scene is adjusted so that the black level of the video is below cutoff and so that the first 30% of the video amplitude does not cause the projector cathode ray tube to come above cutoff. The background information is therefore lost and is not reproduced on the screen under normal viewing conditions.

When the landing lights are turned on, the pedestal of the video is raised, thus bringing the background information into view. In addition, the lines of the raster also become visual and this gives a general haze effect.

Visibility and ceiling circuitry

Figure 2:
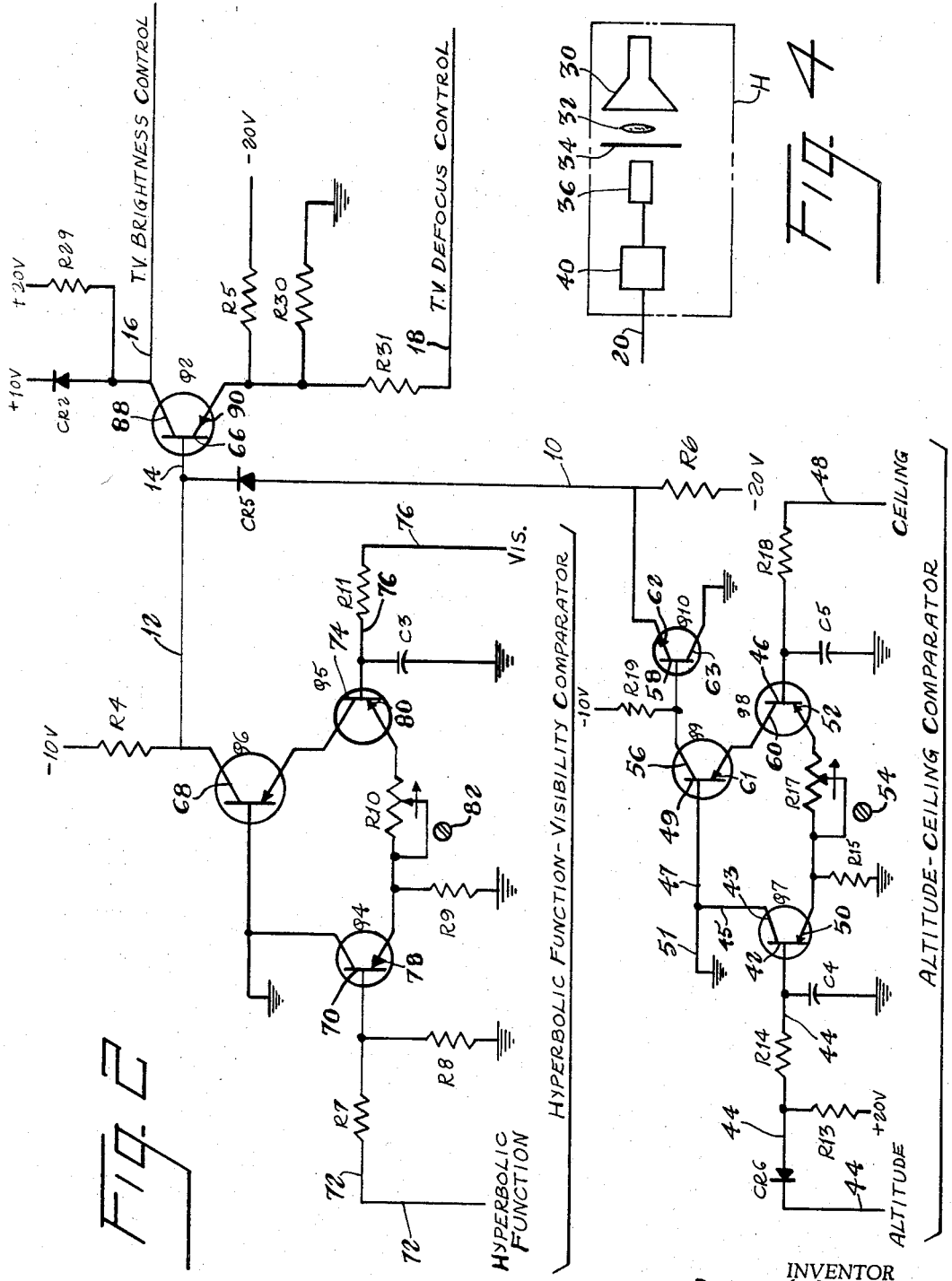
FIG. 2 is a schematic diagram of an altitude-ceiling comparator circuit, a hyperbolic function-visibility comparator circuit, an "AND" gate and a phase splitter all shown in block form in FIG. 1.
Figure 3:
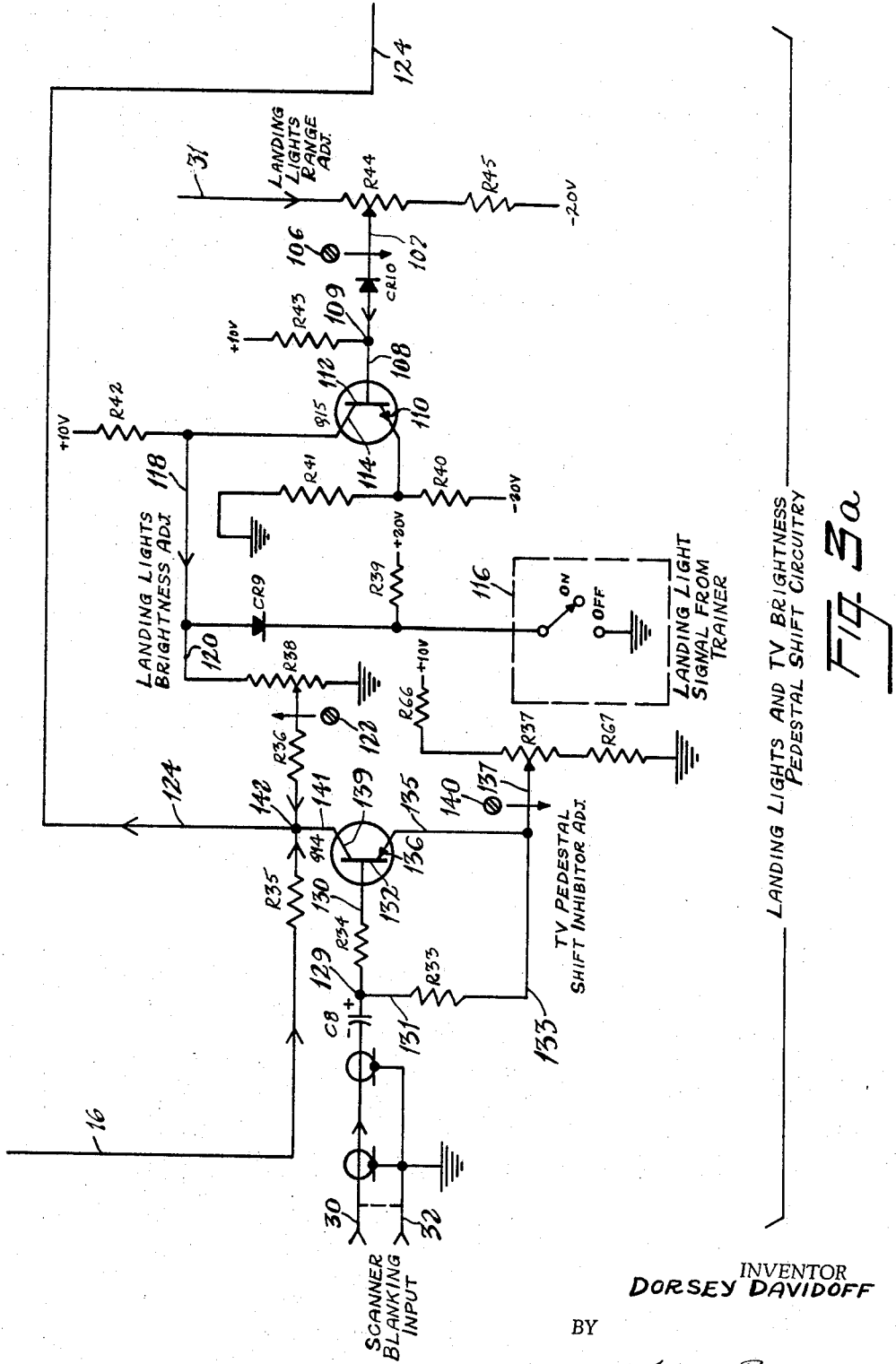
FIGS. 3a and 3b are schematic diagrams of a landing lights and TV brightness pedestal shift circuitry shown in block form in FIG. 1.

Reference is now made to FIG. 2 for an explanation of the development of the TV brightness signal and the projector defocus signal and thereafter to FIGS. 3a and 3b for an explanation of the pedestal shift circuitry in its operation on the signal received from the processor F and passed in modified form to the projector G.

Referring to FIG. 2, the altitude-ceiling comparator A comprises a pair of comparator transistors Q7 and Q8, a current repeater transistor Q9 and an emitter follower or isolation transistor Q10. The base 42 of Q7 is energized from an altitude input signal received on line 44. A diode CR6, connected in series in line 44, and a resistor R13 connected between line 44 and a +20 v. source (indicated) are provided to limit maximum voltage on the base of Q7 to +20 volts D.C. Resistance R14, connected in series in line 44 and capacitor C4 connected between line 44 and ground (indicated) are provided as a filter circuit. The base 46 of Q8 is energized from a signal representative of ceiling received on line 48. Resistor R18 connected in series in line 48 and capacitor C5 connected between line 48 and ground (indicated) are provided as a filter circuit.

The emitters 50 and 52 respectively of Q7 and Q8 are interconnected through a variable resistor R17 having an adjustment screw 54 to adjust the ceiling fade-out rate. The collector 56 of Q9 and the base 58 of Q10 are connected together and to a −10 volt bias (indicated) through a resistor R19. The collector 43 of Q7 and the base 49 of Q9 are connected through lines 45, 47 and 51 to ground (indicated).

The input voltage on line 48 for the base 46 of Q8 is established at an instructor's console (not shown). This input voltage can vary from zero volts D.C. representing zero ceiling, to +12 volts D.C. representing 1000 feet ceiling. For discussion assume the ceiling setting to be 1000 feet (+12 volts D.C.). The input to the base of Q7 is the altitude signal of the aircraft. This voltage varies from zero volts D.C. (zero feet) to +96 volts D.C. (8000 feet). Assume the aircraft to be at 8000 feet (+96 volts D.C.) and starting its descent for a landing. Under the conditions described, Q8 is conducting and Q7 is cut off. As the aircraft altitude lessens, the input voltage at line 44 decreases. This input voltage must pass through diode CR6 to be applied to the base of Q7. Diode CR6 will not conduct until the altitude voltage drops below +20 volts D.C. As the aircraft approaches 1000 feet (+12 volts D.C.), which is the same level to which the ceiling control is set, Q7 will start to conduct. As the altitude continues to decrease, Q7 will conduct heavier. This condition of Q7 is felt at Q8 through the common emitter resistor R17 and reduces the conduction of Q8. This condition continues until Q7 is conducting heavily and Q8 is cut off. The rate of switching is controlled by the setting of R17. The effect this control has on the visual display is to control how abruptly the aircraft passes through the simulated haze and fog and comes into clear visual contact with the landing area.

The output of the Q7–Q8 comparator network is a current from the collector 60 of Q8. This output is applied through emitter 61 to the current repeater transistor Q9 which is operating in the grounded-base mode. The output of Q9 is a voltage developed by this current across resistor R19 and applied to the base 63 of the emitter follower transistor Q10. The output from the emitter 62 of Q10 is a similar voltage which is passed on line 10 to diode CR5 of the "AND" gate C and through diode CR5 and line 14 to the base 66 of Q2, which forms part of the phase splitter D. The signal deveviped on line 10 is a steady state D.C. voltage over the television vertical period as opposed to the hyperbolic function visibility comparator output which may change from line to line of the television image. The voltage on line 10 is zero volts when the ceiling is exceeded and −10 volts when the vehicle is below the ceiling. When they are equal (in the center of the transistor zone) the output is −5 volts.

Figure 5:
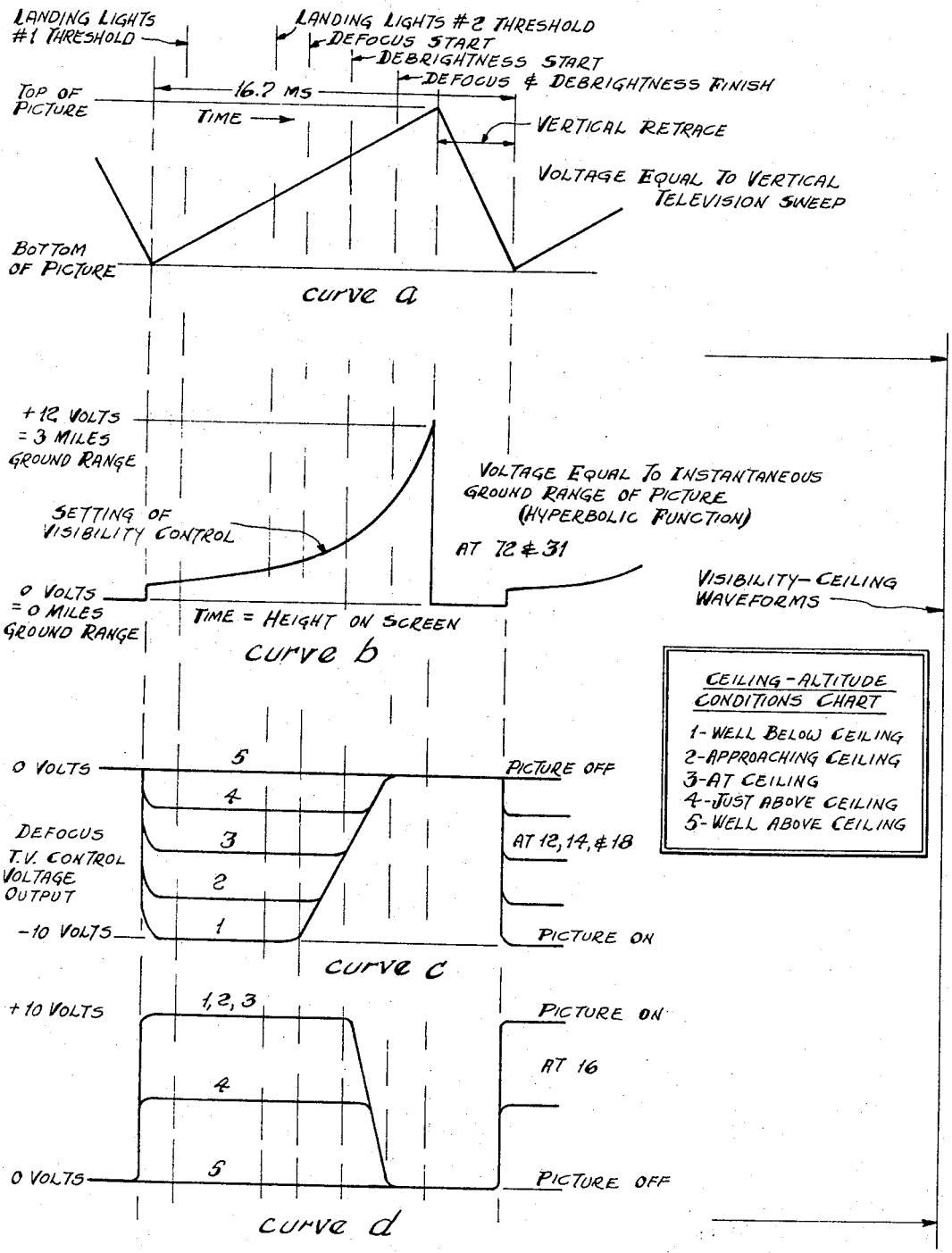

The hyperbolic function-visibility comparator circuit also provides an output from its repeater transistor Q6 directed through the "AND" gate on line 12 to the base of Q2. The diode CR5 and the collector 68 of Q6 together act to function as an "AND" gate such that a resulting signal will be sent to Q2 only if there is a −10 volt signal from Q6 and from Q10. A signal is obtained from Q10 when the vehicle altitude is below the ceiling established. A signal is obtained from Q6 when the instantaneous distance is closer than the visibility limit. The latter will be explained more fully hereinafter. The signal waveforms on lines 12, 14 and 18 is shown in FIG. 5, curve c.

The hyperbolic function-visibility comparator B (FIG. 1) comprises (see FIG. 2) a pair of transistors Q4 and Q5 connected in a comparator network as previously decribed in relation to Q7 and Q8 comparator A. The base 70 of Q4 is energized from an input signal received on line 72 (wave form shown in FIG. 5, curve c) connected to a hyperbolic function signal source (not shown). Series resistor R7 in line 72 and a resistor R8 connected from line 72 to ground (indicated) are provided to scale the voltage to a scale factor of 4 volts per mile. The base 74 of Q5 is energized from an input signal received on line 76 representative of visibility in 4 volts per mile. The resistor R11 in series in line 76 and the capacitor C3 connected between line 76 and ground (indicated) are provided as a filter circuit. The emitters 78 and 80 respectively of Q4 and Q5 are connected through an adjustable resistor R10 having an adjusting screw 82 to adjust visibility fade-out rate. The emitter of current repeater transistor Q6 is connected to the collector of Q5. It operates in the grounded-base mode as shown and provides from its collector 68 a signal (see FIG. 5, curve c) proportional to the visibility of each horizontal TV line as a function of the distance to the ground information represented on that line.

As previously mentioned, hereinabove, responsive to a signal from both the comparator circuits, the "AND" gate passes a signal (see FIG. 5, curve c) to the base 66 of Q2 forming part of the phase splitter circuit D. The emitter output of the phase splitter Q2 is similar to its input on the base. It is used to defocus the display cathode ray tube by operating on the focus regulator. This is done in conjunction with the loss of brightness as controlled by the collector output of Q2. When the base voltage is at −10 volts, the emitter is at −10 volts causing no defocusing and the collector is at +10 volts causing no debrightening. As the base moves from −10 volts to −5 volts the emitter does the same causing defocusing. The collector remains at +10 volts however due to the action of CR2. As the base of Q2 goes from −5 volts to zero volts the emitter does the same causing further defocusing and the collector goes from +10 volts to zero volts causing simultaneous debrigthening. When the collector of Q2 is at zero volts the picture horizontal line normally presented is completely extinguished. Thus, as either (or both) of the comparators indicates that visibility or ceiling is being exceeded the picture first defocuses and then debrightens. This gives a realistic presentation. If one is to back away from a street light on a foggy night one would first notice a loss of sharp definition at a certain distance (defocusing) and at further distances the light appears to dim and finally disappear.

The TV brightness control signal (see FIG. 5, curve c) is taken from the collector 88 of Q2 on line 16 and passed to the pedestal shift circuitry E. The defocus control signal (see FIG. 5, curve c) is taken from the emitter 90 of Q2 and passed through resistor R31 on line 18 to the video projector G.

For better comprehension as this description proceeds it may be noted at this time that the operation on the pedestal to simulate landing lights is a scanning-line to scanning-line operation and is under the control of the hyperbolic waveform signal which represents the distance along the ground vs. time of the vertical scan of the video projector G.

Landing lights hyperbolic function signal fed to the landing lights circuitry (FIG. 3a) is operated upon so that the landing lights are turned on (the pedestal is raised) when the distance is below a certain threshold. When the distance is larger than a second threshold there is no effect on the pedestal. This causes the landing lights to only illuminate objects which are nearby. There is a gradual fade-off between the first threshold and the second threshold. The positions of these thresholds is adjustable and is controlled by a screwdriver adjustment called landing lights range which will be described in relation to FIG. 3a. In addition the effect on the pedestal, that is, how much the pedestal is raised, is controlled by another control which is a screwdriver adjustment and is called landing lights brightness adjustment also to be described in relation to FIG. 3a.

Referring now to FIGS. 3a and 3b, the landing lights pedestal shift signal (TV brightness control signal) (see FIG. 5, curve d) generated from the comparators of FIG. 2 is fed from line 16 as one input to the pedestal shift circuitry of FIGS. 3a and 3b (see FIG. 3a). The video signal from the video processor F is fed into the pedestal shift circuitry on coaxial cable 22–24 and is fed out again to the TV video projector G on another coaxial cable 26–28. These coaxial cables are joined together and connected to a common line 100 from which a pedestal shift waveform signal is added as an output of resistor R53 to modify the signal passing from lines 26–28 to the projector G. This pedestal shift signal voltage is generated by a transistor Q14 (see FIG. 3a).

Landing lights circuitry

The hyperbolic waveform (see FIG. 5, curve b) is supplied as an input on line 31 (FIG. 3a) and is applied to a landing lights range adjustment potentiometer R44 having an adjusting screw 106. Potentiometer R44 adds a negative D.C. voltage to the hyperbolic waveform obtained through a resistor R45 from a source of −20 volts D.C. (indicated). This composite signal (see FIG. 6, curve e) is then passed on line 107 to diode CR10 and through a diode CR10 on line 108 in the form shown in FIG. 5f to the base 112 of transistor Q15. The emitter 110 of Q15 is connected through a resistor R40 to a −20 volt D.C. source (indicated) and through a resistor R41 to ground (indicated). The collector 114 of Q15 is connected through a resistor R42 to a +10 volt D.C. source (indicated). The composite signal from R44 is passed through the diode CR10 forming the second threshold by passing signals only below zero volts as determined by resistors R40 and R42, since R42 and R40 are selected so that Q15 saturates at a value of zero volts. This causes only the part of the hyperbolic wave signal which is now below ground level (due to the addition of the negative D.C. component −20 volts) to appear at the junction 109 (see waveform FIG. 6, curve f) of CR10 and R43.

This composite signal (FIG. 6, curve f) is applied to the base of the amplifier clipper transistor Q15 through line 108. Transistor Q15 has its emitter 110 biased to minus 1.1 volts D.C. by resistors R40 and R41. If the base 112 of Q15 is more negative than 1.1 volts, Q15 is cut-off and the full landing light effect is produced (+8 volts at line 118). As the base 112 goes from minus 1.1 volts to zero volt, the landing light effect is faded off (line 118 goes toward zero volt) until when CR10 does not conduct the landing lights are completely off (line 118 at zero volt) because Q15 is fully conducting.

When Q15 is cut-off its collector 114 is close to +8 volts. When Q15 is conducting its collector 114 is close to zero volt. The collector 114 of Q15 can be held at zero volt, however, by grounding an external landing lights switch 116 which is located near, and is under the control of, the student pilot in the cockpit (not shown) of the training device. This would occur when the landing lights are turned off.

CR9 and R39 act to disconnect the long wire going to switch 116 from the circuitry at line 120. With the switch open the potential on these lines goes up to +20 volts due to R39. This reverse biases CR9 by from 20 to 12 volts depending on the voltage at line 120. Any pickup of hum or transient noise cannot be transferred to the circuitry at 120.

The signal (see FIG. 6, curve f) at the collector 114 of Q15 is fed through lines 118 and 120 to a landing lights brightness adjustment potentiometer R38 having an adjusting screw 122. This is a simple gain control.

The signal at the output of the gain control R38 is then summed through resistors R35 and R36 with the TV brightness control signal (see FIG. 5, curve d) from line 16 to provide an output signal (see FIG. 7, curve j) on line 124. The TV brightness control signal is +10 volts for picture on and zero volt for picture off. The landing lights brightness signal with R38 at maximum is zero volt for landing lights off and +80 volts for landing lights on.

When both of the above signals are in their normal conditions (so as to produce no brightness change in the final picture) the TV brightness control signal is at +10 volts and the landing light brightness signal (regardless of the setting of R38) is at zero volt. The sum of these two voltages as produced by summing resistors R35 and R36 is +5 volts. The pedestal shift caused from line 16 (FIG. 3a) can only be a downward shift from +5 volts which will shift the pedestal down in conjunction with exceeding the visibility or ceiling. The pedestal shift responsive to a signal from line 120 (FIG. 3a) can only be an upward shift from +5 volts which will shift the pedestal up in conjunction with the landing lights being on.

In order to produce the blanking pedestal shift signal the voltages at 142 is connected to a +5 volt source during the blanking time by switching transistor Q14. The voltage at 142 is therefore always returned to +5 volts regardless of its previous value during blanking so as to produce rectangular wave A.C. pedestal shift signal.

Inputs from a blanking voltage generator (not shown) are received on coaxial cable lines 30 and 32. Lines 30 and 32 are connected to the base 132 of a switching transistor Q14 through a capacitor C8, resistor 34 and a line 130. A resistor R33 is connected between the junction 129 of C8 and R34 and the emitter 136 of Q14 through lines 131, 133 and 135 such that C8 and R33 superimpose the input blanking signals (received on lines 30 and 32) on a D.C. average voltage equal to that of the emitter 136 of Q14.

The emitter 136 of Q14 is connected by line 135 to the arm 137 a potentiometer R37. Potentiometer R37 is connected through a resistor R66 to +10 volts (indicated) and through a resistor R67 to ground (indicated) and is provided with an adjusting screw 140 to provide TV pedestal shift inhibitor adjustment.

If no effect is to be produced on the pedestal because the visibility and ceiling units have not been exceeded and the landing lights are not on, then the input to R35 from line 16 is at +10 volts and the input to R36 is at ground. The junction 142 of R35 and R36 is therefore nominally at plus 5 volts. This junction, indicated at 142 is connected to the collector 139 of Q14 by line 141 and is provided with +5 volts by Q14 during the time of the scanner blanking. This plus 5 volts is adjustable by the screw 140 of potentiometer R37 to match the nominal +5 volts which is produced by the summing resistors R35 and R36. It is set by R37. Q14 is a switching transistor and is switched on during the time of the scanner blanking by the scanner blanking signal input at lines 30–32. This signal is coupled by the resistor condenser coupling network including the condenser C8 and the resistor R33 to the base and emitter of the transistor Q14. The resistor R34 is included in series with the base 132 of Q14 as a current limiting resistor.

The operation of Q14 is such as to correct the pedestal shift signal to its nominal value of +5 volts during the time of the scanner blanking input. During the time the scanner is unblanked and video exists, the voltage at the junction 142 of R35 and R36 may be raised by the application of a positive landing light brightness signal applied to R36 or lowered by the application of a visibility ceiling voltage to R35. The signal at the collector of Q14 is therefore a pedestal shift signal which is summed into the video and can shift the video pedestal either positively under the control of the landing lights computer circuitry above described, or negatively under the control of the TV brightness signal obtained from line 16.

The resulting signal is then applied through line 124 to the transistor amplifier Q16 (FIG. 3b) and a transistor power driver Q17 to the summer resistor R53 which sums the pedestal shift signal in with the video going to the projector G (FIG. 1) through lines 26 and 28 (FIGS. 1 and 3b). It is to be understood that video processor F is a conventional type processor having a high output impedance. It is also to be understood that the coaxial cables 26 and 28 include a terminating resistor (not shown) and which normally is 75 ohms.

R53 acts in conjunction with the terminating resistor (not shown) of the video coaxial cables 26 and 28 to perform the summing operation.

The amplifier transistor Q16 has its collector 144 connected through a resistor R46 to +20 volt source (indicated) and its emitter 146 connected to ground (indicated) through resistor R47. The amplifier transistor Q16 is provided with a special effects gain control R48 connected by lines 148 and 150 between the base 152 of Q17 and the collector 144 of Q16 to match the size of the pedestal shift signal to the overall size of the video signal on line 22.

Resistors R49 and R50 connected to the emitter 153 of Q17 and respectively to +10 volts and +20 volts source (indicated) are provided to determine the gain of amplifier Q17. Resistors R51 and R52 connected in parallel to the collector 154 of Q17 and to −20 volt source (indicated) are provided to supply collector voltage to Q17.

The following is a list of elements employed in the above described circuits:

| | |
|---|---|
| Q2—2N1308 | Q17—2N1907 |
| Q4—2N404 | CR2—JAN IN270 |
| Q5—2N404 | CR5—JAN IN270 |
| Q6—2N404 | CR6—JAN IN 270 |
| Q7—2N404 | CR9—JAN IN 270 |
| Q8—2N404 | CR10—JAN IN270 |
| Q9—2N404 | C3—.001 mf. |
| Q10—2N1308 | C4—.001 mf. |
| Q14—2N404 | C5—.001 mf. |
| Q15—2N1308 | C8—10 mf., 15 v. |
| Q16—2N1308 | |

| | |
|---|---|
| R4—2.2K ohms, ½ watt | R36—22K ohms, ½ watt |
| R5—2.2K ohms, ½ watt | R37—1K ohms, ½ watt |
| R6—2.2K ohms, ½ watt | R38—10K ohms, ½ watt |
| R7—22K ohms, ½ watt | R39—3.3K ohms, ½ watt |
| R8—7K ohms, ½ watt | R40—3.6K ohms, ½ watt |
| R9—1.8K ohms, ½ watt | R41—220 ohms, ½ watt |
| R10—1K ohms, ½ watt | R42—1.8K ohms, ½ watt |
| R11—4.7K ohms, ½ watt | R43—47K ohms, ½ watt |
| R13—10K ohms, ½ watt | R44—10K ohms, ½ watt |
| R14—1K ohms, ½ watt | R45—10K ohms, ½ watt |
| R15—1.8K ohms, ½ watt | R46—1K ohms, ½ watt |
| R17—1K ohms, ½ watt | R47—470 ohms, ½ watt |
| R18—1K ohms, ½ watt | R48—1K ohms, ½ watt |
| R19—2.2K ohms, ½ watt | R49—82 ohms, 2 watt |
| R29—2.2K ohms, ½ watt | R50—82 ohms, 2 watt |
| R30—4.7K ohms, ½ watt | R51—330 ohms, 2 watt |
| R31—100 ohms, ½ watt | R52—330 ohms, 2 watt |
| R33—10K ohms, ½ watt | R53—82 ohms, 2 watt |
| R34—1K ohms, ½ watt | R66—1K ohms, ½ watt |
| R35—22K ohms, ½ watt | R67—1K ohms, ½ watt |

As previously indicated hereinabove, the landing lights are produced by adjusting the projector so that the TV or video projector circuit background information is below cut-off and by introducing a pedestal shift into the video to bring the background information up above cut-off. This pedestal shift signal is computed by utilizing the hyperbolic wave already present in the system and used for the horizontal sweep generation of the scanner. This hyperbolic waveform represents the distance of the ground from the ground point directly below the pilot's eye vs. time as it is dynamically swept from the bottom to the top of the TV screen of the pilot. This hyperbolic is applied to the computer B which generates a pedestal shift signal when the distance from the pilot to the ground is below a certain threshold and thereby brightens the TV picture during this time and in addition brings the background material of the runway (not shown) into view.

Figure 6:
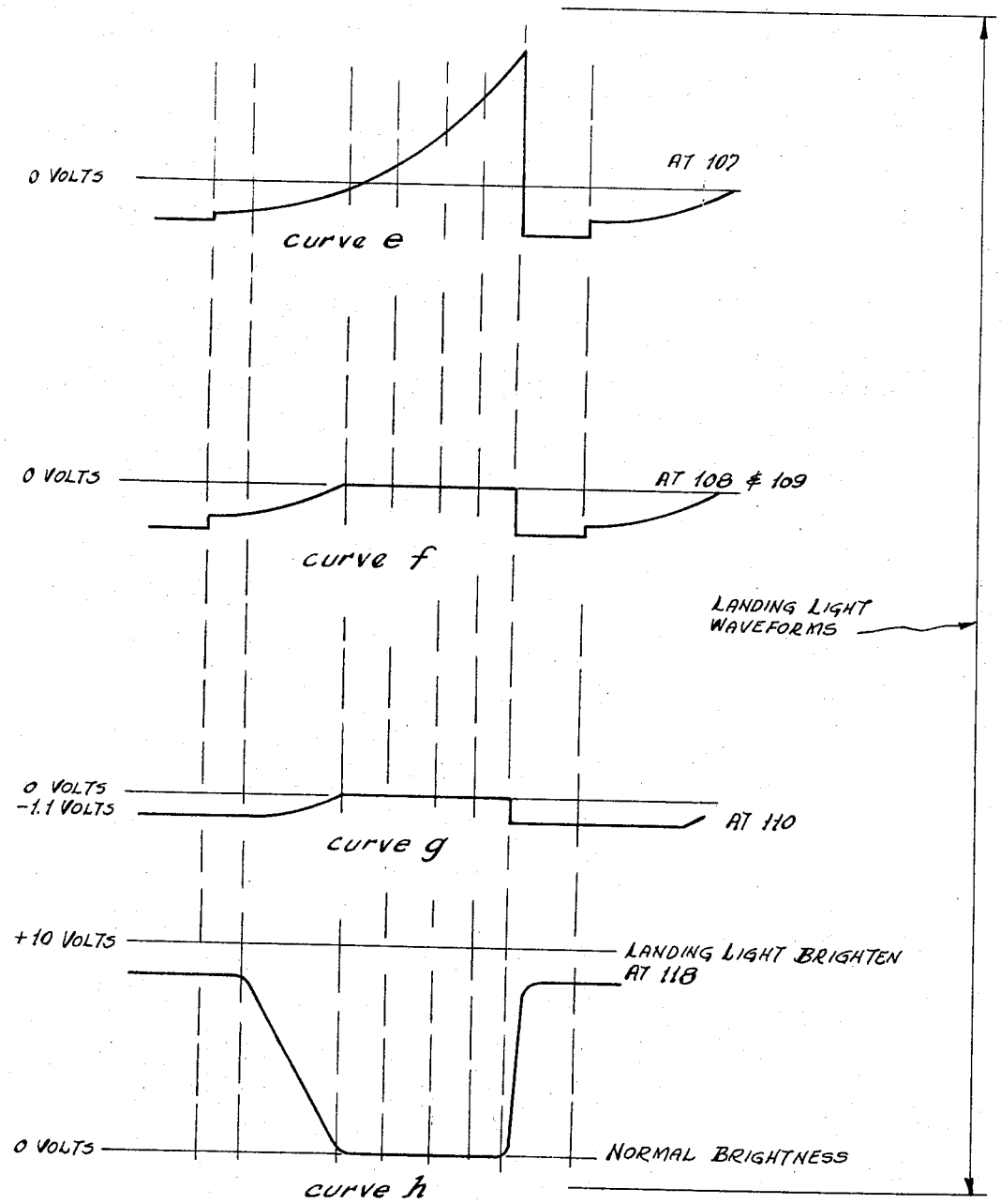

FIGS. 5, 6, and 7 show the system waveforms at various points.

Waveform FIG. 5, curve a shows the vertical television sweep. The picture is swept from the bottom to the top.

Waveform FIG. 5 curve b is a hyperbolic function which is a graph of screen height vs. ground range (of the view on the screen at that point) as expressed in volts vs. time (respectively).

Waveform FIG. 5, curve C shows the TV defocus control voltage output waveform for different values of altitude-ceiling relationship as listed in the ceiling altitude conditions chart. (See FIG. 5, curve c.) Curve c condition one shows the hyperbolic visibility comparator output unmodified by the ceiling visibility comparator. The transition from picture onto picture is actually an amplified and inverted and limited hyperbolic waveform; limited about the voltage range surrounding the visibility control setting.

FIG. 5, curve *d* shows the waveform of FIG. 5, curve *c* again inverted and further amplified for use in producing the pedestal shift signal.

Landing lights waveforms are shown in FIG. 5, curve *b* and FIG. 6, curve *e* thru curve *h*.

The hyperbolic waveform (shown in waveform FIG. 5, curve *b*) is shifted negatively as shown in FIG. 6, curve *e* by an amount proportional to the landing lights range.

CR10 disconnects this voltage from lines 108 and 109 above zero volts as shown in waveform FIG. 6, curve *f*.

Waveform FIG. 6, curve *g* shows the waveform FIG. 6, curve *f* further clipped by the action of the bias of −1.1 volt on the emitter of Q15.

This waveform at FIG. 6, curve *h* is amplified and inverted at the collector of Q15 as shown in waveform FIG. 6, curve *h*.

Pedestal shift waveforms are produced by a resistor summation of waveform FIG. 5, curve *d* and FIG. 6, curve *h* to form the waveforms of FIG. 7, curve *i* and FIG. 7, curve *j* depending on the ceiling-altitude condition. FIG. 7, curve *i* and FIG. 7, curve *j* also show the chopping action of Q14 (during the horizontal blanking time) to +5 volts. R37 is used to adjust the waveform at FIG. 7, curve *i* for zero chopped output between landing lights threshold #2 time and debrighten start time as shown in waveform FIG. 7, curve *i*.

The waveforms at FIG. 7, curve *i* and FIG. 7, curve *j*, are similar to the output waveform added to the video at line 100 (FIG. 3*b*) except for the D.C. level (which is of no consequence after chopping) and the amplitude which is adjustable from zero volts peak to peak amplitude to 3 volts peak to peak amplitude under the control of R48 (FIG. 3*b*).

The final presentation brightens the picture by the pedestal amplitude for each horizontal line as shown in waveform FIG. 7, curve *i*. The white and black levels at the projector are shown on waveform FIG. 7, curve *i* to show how the pedestal shift signal raises the video to bring the lower 30% above the black level cutoff of the projector during the landing lights portion. During the debrightening portion the video is dragged down so that it is all below cutoff as shown for time after the debrightness finish point.

It is believed apparent from the above description of one embodiment of the subject invention that each of the objects and advantages hereinabove set forth have been satisfied. In particular there has been described and illustrated apparatus and method by which actual landing conditions involving variables of altitude, ceiling, visibility and the effect of landing lights from a plane onto a landing area may be realistically simulated.

It will be understood that various changes in the details, materials and arrangements of parts and steps, which have been herein described and illustrated in order to explain the nature of the invention, may be made by those skilled in the art within the principle and scope of the invention as expressed in the appended claims.

It is claimed:

1. A simulator for aircraft landing conditions comprising,
   (a) a landing area scene generator for developing an electrical signal representative of a scene in which the background material is contained within the zero to 30% levels of brightness compared with the 100% brightness of artificial night landing lighting,
   (b) a video processor and video projector connected to said generator to project said scene,
   (c) a landing lights and TV brightness pedestal shift circuitry arranged to receive a scanner blanking input signal, a hyperbolic function input signal and a composite TV brightness control signal,
   (d) said shift circuitry being connected to said processor and projector to vary the pedestal blanking level of said projector to controllably and selectively bring said background material into view or to bring all video information out of view responsive to variation of said TV brightness control signal, and
   (e) comparator means arranged to receive a hyperbolic function input and signals representative of altitude, ceiling and visibility to develop said composite TV brightness control signal and connected to said pedestal shift circuitry to pass said composite signal to said pedestal shift circuitry.

2. A simulator according to claim 1, said comparator means including,
   (a) "AND" gate means connected to said pedestal shift circuitry,
   (b) an altitude-ceiling comparator for receiving signals representative of altitude and ceiling and connected to pass a resulting compared signal to said "AND" gate,
   (c) a hyperbolic function-visibility comparator for receiving a hyperbolic function input and a signal representative of visibility and connected to pass said signal to said "AND" gate.

3. A simulator according to claim 2, including,
   (a) a phase splitter connected to receive the output of said "AND" gate and to pass said TV brightness control signal to said pedestal shift circuitry to control the pedestal blanking level and to pass a separate defocus-supply signal to said video projector to simulate a haze effect.

4. A simulator according to claim 1, said altitude-ceiling comparator including,
   (a) a pair of comparator transistors for receiving respectively input signals representative of altitude and ceiling conditions, a current repeater transistor connected to said comparator transistor and an emitter follower transistor connected to receive the output of said repeater transistors, and,
   (b) an adjustable potentiometer connected between the emitters of said comparator transistors to adjust the ceiling fade-out rate.

5. A simulator according to claim 1, said hyperbolic function-visibility comparator including,
   (a) a pair of comparator transistors for receiving respectively input signals representative of visibility and a hyperbolic function and a current repeater transistor connected to said comparator transistors,
   (b) an adjustable potentiometer connected between the emitters of said comparator transistors to adjust the visibility fade-out rate.

6. A simulator according to claim 1, said pedestal shift circuitry including,
   (a) a pair of transistors including a scanner blanking transistor and a hyperbolic function input transistor for receiving respectively input signals representative of scanner blanking input signal and hyperbolic function input signal,
   (b) a summing resistor circuit connected to receive signals from said scanner signal transistor, said hyperbolic function input transistor and to receive said TV brightness control signal from said comparator circircuits, said pedestal shift circuitry including also
   (c) an amplifier transistor, power driver transistor and summer resistor connected in series to receive the output of said summer resistor circuit and provide a pedestal blanking level control signal to said projector.

7. A simulator according to claim 6 including,
   (a) potentiometer means connected to the emitter of said scanner blanking transistor and to a source of voltage bias to provide TV pedestal shift inhibition adjustment,
   (b) potentiometer means connected to said summing circuit and to a source of voltage bias to provide landing lights brightness adjustment, and
   (c) potentiometer means connected to said hyperbolic function transistor and to a source of voltage bias to provide landing lights range adjustment.

8. A simulator according to claim 1, said generator including,
   (a) a slide of an aircraft landing area scene having lights and background material,
   (b) a flying spot scanner to provide an output signal representative of said slide scene,
   (c) said slide being made to provide close to 100% transmittance of said lights and up to 30% transmittance of said background material.

References Cited

UNITED STATES PATENTS

| 3,060,596 | 10/1962 | Tucker et al. | 35—10.2 |
| 3,122,845 | 3/1964 | Kebbor | 35—12 |
| 3,257,506 | 6/1966 | Siepmann | 178—6.8 |
| 3,296,368 | 1/1967 | Lohmann | 178—6.8 |
| 3,336,587 | 8/1967 | Brown | 178—6.8 X |

EUGENE R. CAPOZIO, *Primary Examiner.*

R. W. WEIG, *Assistant Examiner.*